(12) United States Patent
Fages et al.

(10) Patent No.: US 10,976,214 B2
(45) Date of Patent: Apr. 13, 2021

(54) FAIL-SAFE TANK WITH INTEGRATED SENSOR AND METHODS FOR DETECTING A LEAK IN A WALL OF THE TANK

(71) Applicant: Ratier-Figeac SAS, Figeac (FR)

(72) Inventors: Christian Fages, Figeac (FR); Bruno Seminel, Figeac (FR)

(73) Assignee: RATIER-FIGEAC SAS, Figeac (FR)

( * ) Notice: Subject to any disclaimer, the term of this patent is extended or adjusted under 35 U.S.C. 154(b) by 163 days.

(21) Appl. No.: 16/190,569

(22) Filed: Nov. 14, 2018

(65) Prior Publication Data
US 2019/0257710 A1 Aug. 22, 2019

(30) Foreign Application Priority Data

Feb. 21, 2018 (EP) ..................................... 18305182

(51) Int. Cl.
*F17C 13/00* (2006.01)
*G01M 3/32* (2006.01)
(Continued)

(52) U.S. Cl.
CPC ............. *G01M 3/3272* (2013.01); *F17C 1/00* (2013.01); *F17C 13/002* (2013.01); *F17C 13/025* (2013.01); *F17C 13/06* (2013.01); *B64C 1/1407* (2013.01); *B64D 25/14* (2013.01); *F17C 2205/0111* (2013.01); *F17C 2205/032* (2013.01); *F17C 2205/0338* (2013.01); *F17C 2205/0391* (2013.01); *F17C 2221/031* (2013.01); *F17C 2223/0123* (2013.01); *F17C 2223/035* (2013.01); *F17C 2225/036* (2013.01); *F17C 2250/043* (2013.01); *F17C 2250/0434* (2013.01); *F17C 2260/038* (2013.01); *F17C 2270/0189* (2013.01)

(58) Field of Classification Search
CPC ................................ G01M 3/3272; F17C 1/00
See application file for complete search history.

(56) References Cited

U.S. PATENT DOCUMENTS 9,211,792 B2 * 12/2015 Balloul ............... F02D 19/0665
2004/0113017 A1 6/2004 Baderspach et al.
(Continued)

FOREIGN PATENT DOCUMENTS

| DE | 102007004456 A1 | 7/2008 |
| EP | 2199656 A1 | 6/2010 |
| WO | 2016179371 A1 | 11/2016 |

OTHER PUBLICATIONS

Extended European Search Report for International Application No. 18305182.0 dated Aug. 30, 2018, 8 pages.

*Primary Examiner* — Jamel E Williams
(74) *Attorney, Agent, or Firm* — Cantor Colburn LLP

(57) ABSTRACT

A tank that may be used in combination with an actuating means such as a pneumatic door actuator includes a first, inner, enclosure positioned and enclosed within a second, outer, enclosure, to provide an enclosed chamber between the inner enclosure and outer enclosure. The pressure in the chamber may be measured with a gauge that does not extend into the inner enclosure. The measured pressure may then be monitored and compared in order to detect a change in pressure and thereby also detect a leak through a wall from the inner enclosure. The tank may also be used to inflate and/or deploy an emergency evacuation slide in an aircraft.

12 Claims, 3 Drawing Sheets

(51) Int. Cl.
  *F17C 13/02*   (2006.01)
  *F17C 1/00*    (2006.01)
  *F17C 13/06*   (2006.01)
  *B64C 1/14*    (2006.01)
  *B64D 25/14*   (2006.01)

(56) References Cited

U.S. PATENT DOCUMENTS

2011/0225963 A1   9/2011   Delbos
2016/0325927 A1*  11/2016  Chitwood ............ B65D 90/046
2017/0002978 A1   1/2017   Ballinger et al.
2017/0096938 A1   4/2017   Kenworthy et al.
2017/0097254 A1   4/2017   Smith et al.

* cited by examiner

FAIL-SAFE TANK WITH INTEGRATED SENSOR AND METHODS FOR DETECTING A LEAK IN A WALL OF THE TANK

FOREIGN PRIORITY

This application claims priority to European Patent Application No. 18305182.0 filed Feb. 21, 2018, the entire contents of which is incorporated herein by reference.

TECHNICAL FIELD

The subject matter disclosed herein relates to a pressurized gas tank. In particular, the pressurized tanks may be pneumatic tanks that can be used as an actuator for opening a door in an aircraft. Other uses are, however, also envisaged, including for example, the deployment or inflation of an aircraft evacuation slide.

BACKGROUND

Known pressurized gas tanks that may, for example, be used in an actuator of a door mechanism of an aircraft often use a manometer for measuring and indicating pressure within the tank. Such tanks are not fail-safe and so if there is a failure in the tank, the tank will empty meaning that it would then not be possible to open the aircraft door or evacuation slide in an emergency situation. Due to this disadvantage with known systems, the cabin crew or maintenance crew (or aircraft monitoring system) must always check before flight that the manometer indicates the correct pressure before take off. If there is a crack in the tank during the flight, however, the tank will empty and the pressure will reduce. This may well result in it being impossible to open the door or actuate the evacuation slide in an emergency situation. The new and improved pressurized gas tanks described herein therefore aim to overcome such disadvantages with known devices.

BRIEF SUMMARY

A tank is described comprising: a first, inner enclosure provided inside a second, outer enclosure to form an enclosed chamber between the outer surface of the wall of the first enclosure and the inner surface of the wall of the second enclosure, and wherein a first pressurized gas is provided within said first, inner enclosure; and wherein a pressure measuring sensor is positioned relative to said chamber so as to allow the measurement of a pressure within said chamber.

The inner enclosure may therefore be described as being positioned and enclosed within the second enclosure, to thereby provide this chamber between the two enclosures.

In some examples, a pressurized gas may also be provided in the chamber. In other examples, the chamber may be under vacuum.

Either one or both enclosures of the tank may, in some examples, be made by an additive manufacturing method. In some examples, both enclosures are made as a single, unitary part. This may be achieved by additive manufacturing.

The tank may further comprise a pressure measuring sensor that is positioned relative to the first and second enclosures so as to allow the measurement of a pressure within said chamber.

In some examples described herein, the pressure measuring sensor may be provided so as to extend into the chamber to allow it to measure the pressure within the chamber.

In some examples described herein, the pressure measuring sensor does not extend into the inner enclosure of the tank but may extend from outside of the tank and through the outer wall of the second enclosure in order to reach and monitor the pressure in the chamber. In some examples, this pressure measuring sensor may comprise a manometer.

In some examples, the pressure measuring sensor does not penetrate the outer wall into the chamber. In some examples, the pressure measuring sensor may comprise a membrane and a strain gauge provided on the outer surface of the tank or chamber, for measuring the pressure inside the chamber.

The membrane that forms part of the pressure measuring sensor may also be formed integrally with the first and second enclosures. This may be achieved via an additive manufacturing method, or other methods. The fact that this is formed integrally with the tank provides advantages in that there is less chance of leaks forming.

In any of the examples described herein, the tank may be used in combination with an actuating system. The tank may therefore be used for holding a pressurized gas in the first, or inner, enclosure and the tank may be connected to a body of the actuating system to allow the gas to flow from the first tank to the actuator in the event of an emergency.

In any of the examples described herein the tank may be a pneumatic tank that is connectable to a pneumatic door actuating mechanism.

In any of the examples described herein the tank may be a pneumatic tank connectable to an aircraft inflatable evacuation slide.

In any of the examples described herein, a wall of the inner enclosure may comprise a section that is configured to perforate upon application of an impact force to that section to form an exit of the inner enclosure. In some examples, a percussion device may be used to apply the impact force to this section. This is useful in emergency situations to allow the pressurized gas within the inner enclosure to escape via the exit of the inner enclosure and provide the force and flow of gas out of the tank and into the actuating system for actuating the door or deploying the slide. In order for the door to be opened or the slide to be deployed, the energy from the tank needs to be transmitted to the door or slide. The energy is the force times the displacement or the pressure times the flow of gas.

In some examples, a pressure regulator may be provided having a first end that is positioned internally to the inner enclosure and an opposite, second end positioned at the section of the inner enclosure that may be perforated. The second end of the pressure regulator may therefore also form part of the wall of the inner enclosure that provides the section that is configured to perforate upon application of an impact force/energy by a percussion device/impactor. In some examples, the section that is configured to perforate may further comprise a membrane that perforates when an impact force is applied to the percussion device and transferred to the membrane, to thereby perforate the wall of the inner enclosure and allow the pressurized gas to be released. The pressure regulator may also be integrally formed with the tank. This may be achieved using additive manufacturing methods. Other methods may also be envisaged. The fact that this is formed integrally with the tank provides advantages in that there is less chance of leaks forming as no seals are needed and seals are known sources for leakage A method is also described for manufacturing a pneumatic tank comprising: forming a first, inner enclosure within a second, outer enclosure, to provide an enclosed chamber between the first enclosure and the second enclosure, and providing a pressure measuring sensor positioned relative to said chamber so as to allow for the measurement of a pressure within said chamber.

In some examples, this chamber may be formed so as to be closed upon forming. In other methods, the chamber may be sealed at a later time.

These enclosures and chamber may also be formed using an additive manufacturing method.

The method may further comprise providing a pressure measuring sensor positioned relative to the chamber and/or enclosures so as to allow the pressure within the chamber to be measured. In some examples, the pressure measuring sensor may be provided on an external surface of the chamber and does not penetrate the wall into the chamber. In such examples the pressure measuring sensor may comprise a membrane and a strain gauge, for example. In other examples, a pressure measuring sensor may be provided so as to extend into the chamber for measuring the pressure within the chamber. In such examples the pressure measuring sensor may be a manometer. Other pressure measuring sensors may also be used, however.

In some examples, the first and second enclosures and a membrane of said pressure measuring sensor may be formed by an additive manufacturing method.

In some examples, the method may further comprise providing means for perforating the wall of the internal enclosure in the case of an emergency to thereby release the gas therein. This may comprise providing a percussion device and impacting a section of the wall of the inner enclosure. This section of the wall can be designed so as to perforate upon application of the impact force by the percussion device. In some examples, the inner enclosure comprises a pressure regulator and the impact force may be applied to a membrane that is positioned between the pressure regulator and the inner cavity of the first enclosure. In other examples, the membrane may alternatively be positioned downstream of the pressure regulator. In some examples the membrane used may be replaceable.

A method of independently detecting a leak of gas from either of the enclosures of the pneumatic tank is also described herein. The method may comprise using said pressure measuring sensor to measure the pressure in said chamber and detecting a change in said pressure over time, said change in pressure over time indicating said leak in said tank.

In some examples, the method may comprise comparing the pressure within said chamber to a pressure outside of said chamber.

In some examples, the method may comprise comparing a pressure within said chamber to a threshold or thresholds to detect an increase or decrease in said pressure within said chamber, said increase or decrease indicating a leak in said tank.

In some examples, the method comprises: forming a first enclosure within a second enclosure, to provide an enclosed chamber between the first enclosure and the second enclosure and providing a first pressurized gas in the first enclosure. A second pressurized gas may also be provided in the chamber. Alternatively, the chamber may be under vacuum. The pressure within the first enclosure and the pressure within the chamber may be different to each other. In some examples the gas in the inner enclosure may be at a higher pressure than the gas in the chamber. The gas provided in the inner enclosure and the chamber may be the same, or different types of gases; preferably, however, they are the same gas but just at different pressure levels to each other.

The method may further comprise providing a pressure measuring sensor or sensors to measure the pressure within the chamber. In some examples a second pressure measuring sensor may be provided to measure the pressure outside of the tank, for comparison.

As mentioned above, in some examples the pressure sensor may extend from outside of the tank, through the wall of the outer enclosure and into the chamber. In some examples, the pressure measuring sensor may be a membrane and a strain gauge that are positioned externally to the chamber.

The method for detecting a leak through a wall of the inner and/or outer enclosure of the fail-safe tank may comprise measuring the pressure within the chamber and detecting a change in the pressure, the change in pressure indicating the leak.

The method may also/alternatively comprise: comparing the pressure within the chamber to a pressure outside of the chamber. For example, the method may comprise measuring both the pressure in the chamber and the pressure outside of the chamber and comparing these pressures over time to detect a change in either pressure.

In some examples, it is possible to detect that the leak is through the wall of the inner enclosure by detecting an increase in the pressure of the chamber. No other pressures therefore need to be measured in this method.

In some examples, it is possible to detect that the leak is through the wall of the outer enclosure by detecting a decrease in the pressure of the chamber. Again, no other pressures therefore need to be measured in this method.

In other examples, the method may comprise the sensor measuring the absolute pressure in the chamber and comparing the absolute pressure to a threshold or thresholds. The method may further comprise detecting a leak based on said comparison. In this example no comparison is then needed with another pressure measured elsewhere and instead the method is able to detect the failure of the tank based on a comparison with a threshold(s).

In any of the examples described herein, the tank may be a fail-safe pneumatic tank for holding a gas within the inner enclosure and the tank may be connectable/connected to a pneumatic door actuating mechanism or an actuating system for an evacuation slide. The examples described herein may also find use in other applications and are not limited only to doors and evacuation slides.

BRIEF DESCRIPTION OF THE DRAWINGS

The subject matter is particularly pointed out and distinctly claimed in the claims at the conclusion of the specification. The foregoing and other features and advantages of the embodiments are apparent from the following detailed description taken in conjunction with the accompanying drawings in which like elements are numbered alike in the FIGURES:

DETAILED DESCRIPTION

In currently known pressurized gas tanks that are used for inflating or deploying a door mechanism or an inflatable evacuation slide in an aircraft, the manometer is initially manufactured separately to the tank and later positioned so as to extend into the enclosure that contains the pneumatic gas, in order to measure and indicate the internal pressure of the gas held therein. It has been found, however, that, since the manometer extends through the wall of the enclosure, this can cause leaks, and even minor leaks can lead to failure of the actuating system if the gas has escaped.

Figure 1:
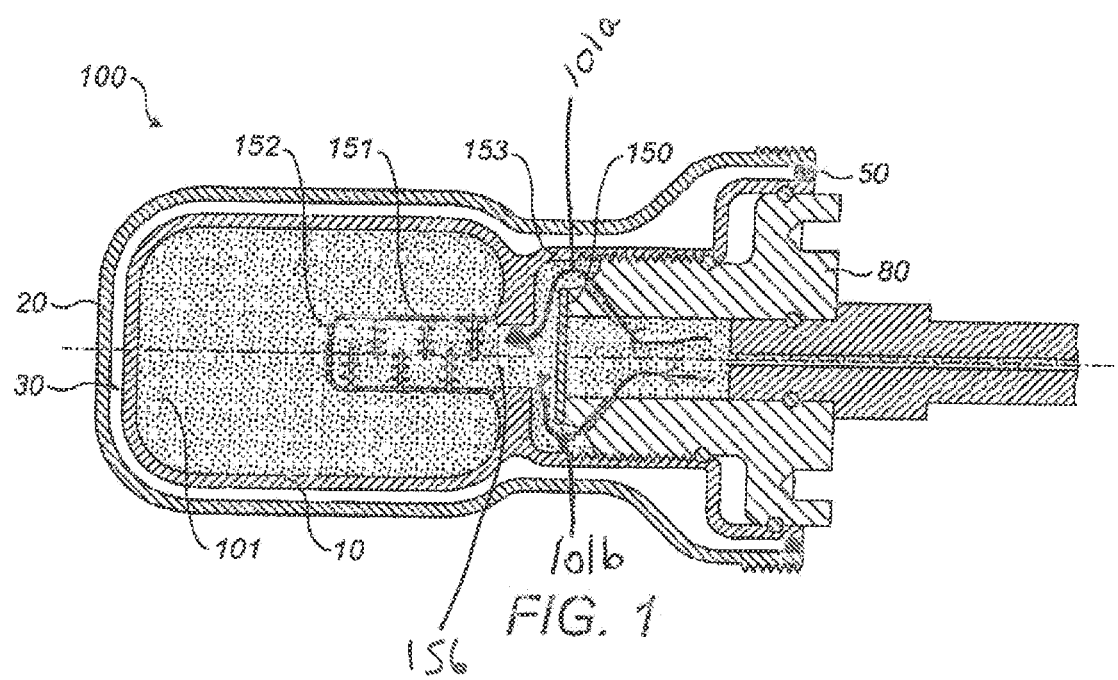
FIG. 1 depicts a new type of fail-safe tank without the percussion device attached and whilst the tank is being filled
Figure 2:
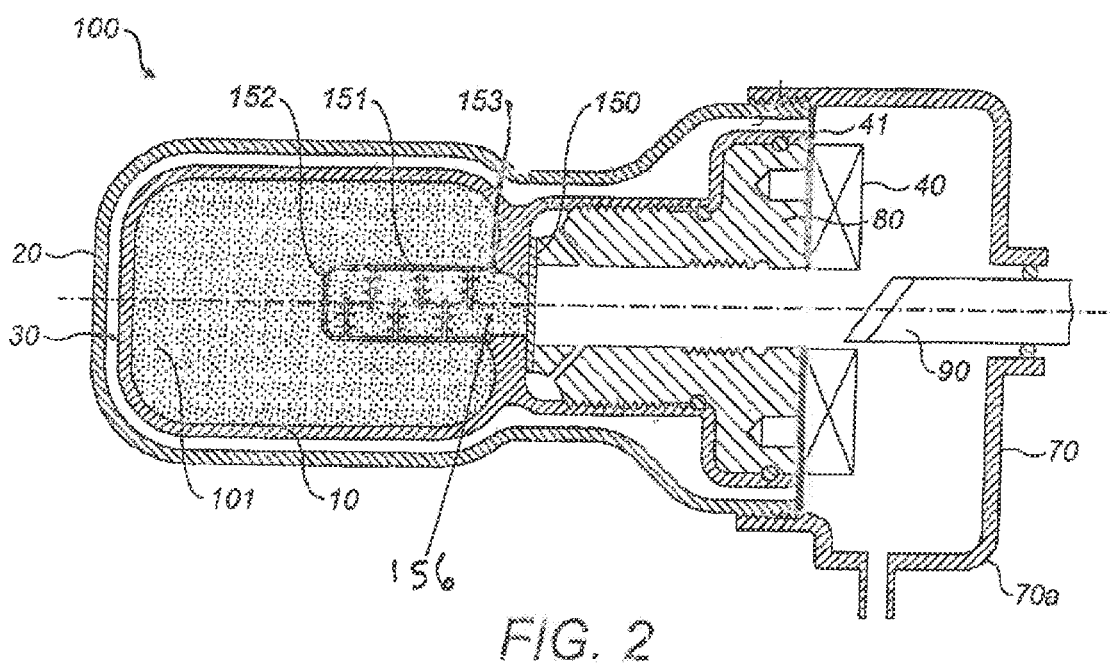
FIG. 2 depicts the new type of fail-safe tank of FIG. 1 with the percussion device/system attached and with the tank sealed shut.

Referring now to the drawings, FIGS. 1 and 2 depict a new type of pneumatic actuator tank 100 that may be used in many situations, but is particularly useful for actuating the opening of a door in an aircraft or for actuating the inflation or deployment of an evacuation slide. The tank 100 shown in FIGS. 1 and 2 is able to measure the internal pressure of the gas 101 held within the tank using a measuring means (e.g. pressure gauge or sensor 40) that is positioned externally of the main enclosure that contains the pressurized gas, thereby preventing any possibility of a leak from this enclosure.

For example, FIGS. 1 and 2 depict a new type of fail-safe tank 100. FIG. 1 shows the tank prior to being connected to a percussion device and an actuating system and FIG. 2 shows the tank following being connected to the percussion device. The tank 100 comprises a first, inner, enclosure 10 positioned and enclosed within a second, outer, and larger enclosure 20. A sealed chamber 30 is therefore provided between the outer surface of the first, or inner, enclosure 10 and the inner surface of the second, or outer, enclosure 20.

In some examples both enclosures 10, 20 of the tank 100 may be made by an additive manufacturing process and the chamber 30 between the two enclosures may then be sealed by a weld 50. The weld 50 can be performed using a laser or other known welding process.

Preferably, however, the entire tank 100 is made as a single unitary part by an additive manufacturing process. In such examples, the chamber 30 is manufactured in this way so as to already be closed and in this case no further weld 50 would then be required. This has the advantage of reducing the potential for leaks since seals may sometimes prove to be a weak spot for such leaks. The inner enclosure 10 of the tank may have a pressurized gas 101 provided therein. In some examples, a second, pressurized gas is provided in the chamber. In some examples, the chamber may be held under vacuum.

A method of detecting a leak in the tank in or through one (or both) of the walls of the enclosures may be performed by providing a gauge or sensor 40 for measuring the pressure in the internal chamber 30 between the enclosures 10, 20. This measurement of the pressure of the chamber 30 may then be compared with a measurement of the pressure of the air outside of the tank 100 (i.e. externally to the outer enclosure 20). This is called a relative pressure sensor.

In other examples, the method for detecting a leak through one of the walls of the enclosure of the tank may comprise the sensor measuring the absolute pressure in the chamber 30. In this example, no comparison with other pressure(s) is needed. Instead the method is able to detect the failure of the tank based on thresholds of the measured pressure level within the chamber. This is called an absolute pressure sensor, wherein the pressure in the chamber is measured without having to compare the pressure to a reference pressure taken from a different location.

The gauge or sensor 40 may also be integrally formed with the tank 100 and in some examples may be positioned so as to extend into and within the chamber 30 between the enclosures 10, 20. In contrast to known tanks, no pressure gauge is provided so as to extend through the wall of and into the first, inner enclosure 10 itself that contains the pressurized gas 101. This therefore prevents any possibility of leaks or cracks forming in the wall of the inner enclosure 10 due to the wall being perforated by a sensing device.

In some examples, the pressure sensor may comprise a strain gauge that can be fixed onto a membrane 41 that is positioned and attached to the outside the chamber of the tank 100. The strain gauge may therefore be bonded to the surface of the membrane to measure the pressure in the chamber 30 between the two enclosures 10, 20 of the tank 100. The membrane 41 therefore may be considered as being part of the pressure gauge itself. Such strain gauges should be located on the external face of the membrane 41 so that any wiring routing does not prove to be an issue for leakages.

Figure 5:
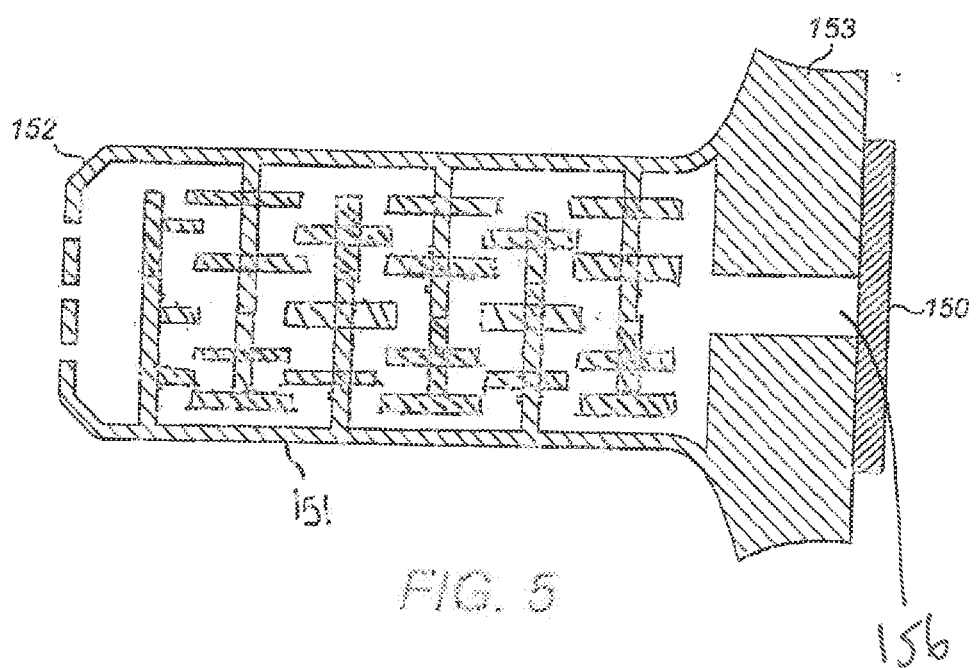
FIG. 5 depicts a side view of a pressure regulator that may be used in associated with the inner enclosure of the tank.

A pressure regulator 151 may also be integrally formed with the tank 100, the pressure regulator extending into the internal cavity of the inner enclosure 10 that holds the gas medium, as shown in FIGS. 1 and 2. In some examples, the pressure regulator 150 may be located at the exit 156 of the tank and at the exit of the inner enclosure 10. As shown in these figures as well as FIG. 5, a first end 152 of the pressure regulator 151 extends into the internal cavity of the inner enclosure 10 for regulating the pressure and flow at an exit point 156 of the inner enclosure 10. As shown in FIG. 5, the pressure regulator 151 extends from this first end 152 to the other, second, end 153 which is at the exit 156 to the inner enclosure 10. The end 153 that provides the exit 156 of the inner enclosure 10 may further comprise a thin aluminum disc 150. In other examples, other metals or even plastics may be used. This disc 150 may be perforated by a percussion device in order to release the gas therein.

In other examples, the membrane may instead be positioned upstream from the pressure regulator 151 (i.e. positioned between the chamber 30 and the pressure regulator 151). Although this alternative example works well, when the pressure regulator 151 is integrally formed with the tank 100 it would not be possible to replace the membrane.

A nut 80 may further be provided at the second end 153 of the pressure regulator 151 to apply pressure to the disc/membrane 150 of the tank 151 after the inner enclosure 10 has been filled with the gas 101. The nut therefore acts to seal the tank by trapping the membrane/disc tight against the exit 156. This therefore seals the tank shut. FIG. 1 shows the tank with the nut 80 positioned so as to allow the gas to flow (as shown by the arrows 101a, 101b) into the tank 100. FIG. 2 on the other hand shows the nut 80 in position so that the tank 100 and inner enclosure 10 is sealed shut. Although a nut 80 is shown in the figures, of course, other means could be used to apply pressure in this way and the examples are not limited only to the use of a nut 80. This therefore closes the inner enclosure 10 to retain the pressurized gas 101 therein.

As mentioned above, in some examples, both the chamber 30 and the inner enclosure have a gas provided therein. The gas within the cavity of the inner enclosure 10 may be pressurized and the gas provided within the chamber 30 may also be pressurized but at a different, lower, pressure. For example, the pressure in the chamber may be approximately half the pressure in the inner enclosure. Other pressures are also possible. In some examples, the chamber is under vacuum.

Under normal conditions, the pressure inside the internal cavity of the first enclosure 10 (i.e. the enclosure that contains the pneumatic gas) may be in the region of 220 Bar. If the wall(s) of this inner, first, enclosure 10 cracks and a leak is formed, the gas 101 would then leak from inside the first enclosure 10 and flow into the chamber 30 provided between the first enclosure 10 and the second enclosure 20. In this case, the pressure in the chamber 30 will rise to a value that is in proportion to the ratio of the volumes between the inner enclosure 10 and the chamber 30. Due to this, the detection of an increase in pressure in the chamber between the inner and outer enclosures will inform the crew that the inner enclosure 10 of the tank 100 has a leak and has failed.

Correspondingly, if the outer enclosure 20 has a leak and fails, the pressure in the chamber 30 will decrease and will drop to equal the external pressure. Therefore, the detection of a decreased or decreasing pressure in the chamber 30 will inform the crew that the wall(s) of the outer enclosure 20 has a leak and the outer enclosure 20 has failed. In these ways, the changes in pressure of the chamber 30 may provide a means of detecting a leak in the tank.

The presence of these two enclosures 10, 20, one inside the other, therefore provides the "fail safe" feature of the tank 100, since any leakage of gas from the inner enclosure 10 to the outside of the tank will be fully prevented due to the double enclosure 10, 20 and the fact that the pressure measuring features of the tank 100 allow for the detection and identification of an independent failure of or leak in the wall of either the inner or outer enclosure. This means that even if there is a leak in the wall of the inner enclosure and the pressurized gas escapes into the chamber 30, the pressure will still be maintained (albeit at a slightly reduced level) thanks to the presence of the wall of the outer enclosure 20. The tank may be described as being "fail-safe" also due to the fact that it is made having two enclosures 10, 20 that can be made by an additive manufacturing method.

As mentioned above, if there is a leak in the wall of either enclosure 10 or 20, the gas 101 will flow into or out of the chamber 30 between the walls of the two enclosures 10, 20 and the gauge 40 will then measure and detect the change in pressure inside the chamber 30. This can be measured and detected over time to indicate the change in pressure and therefore the leak. That is, the gauge 40 will measure the pressure within the chamber 30 and if there has been a leak through the wall of the inner enclosure 10 then the increased pressure within the chamber 30 will indicate this leak. As also mentioned above, if the pressure in the chamber 30 decreases over time, this will indicate the presence of a leak in the wall(s) of the outer enclosure 20.

FIG. 2 depicts the fail-safe tank 100 after it has been filled with the gas 101 and the percussion device 90 has been connected thereto. As mentioned above the tank 100 can be connected to the body of an actuator or actuating system (not shown). The pneumatic medium 101 stored in the inner enclosure 10 can then be used in the actuating system for opening a pneumatic door, such as a door of an aircraft, or for inflating and/or deploying an evacuation slide in the event of an emergency.

For example, under normal working conditions, when the aircraft crew wishes to open the door of the aircraft, the crew must simply push the door open using their own force. In contrast to this, in the event of an emergency, the examples described herein use the potential energy that is stored and accumulated within the tank 100 to provide the force/pressure and displacement/flow for opening the door/deploying the evacuation slide. This is achieved using the percussion device 90 which provides an impact force on the wall of the first, or inner, enclosure 10, to thereby perforate the wall of the inner enclosure 10 and allow the pressurized gas to be released from the internal cavity of the inner enclosure 10 and sent to an actuator that thereby enables the door to open or the evacuation slide to be deployed and/or inflated.

The pressure regulator may also be provided in association with the percussion device 90, which may act to reduce/control the flow of gas 101 from the tank 100 after percussion of the aluminum membrane 150 of the pressure regulator 151 and/or the membrane 50 on which the pressure sensor 40 is positioned. The pressure regulator (i.e. flow reducer) may also be made by an additive manufacturing method so that it is integrally formed with the other parts/components of the tank 100.

Figure 3:
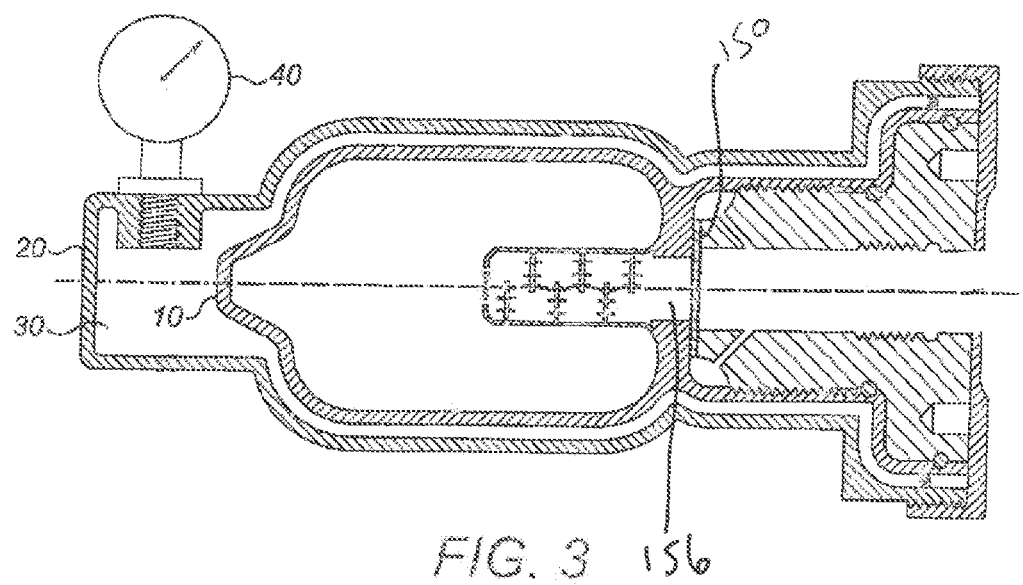
FIG. 3 depicts an example of the new type of fail-safe tank with a manometer attached.
Figure 4:
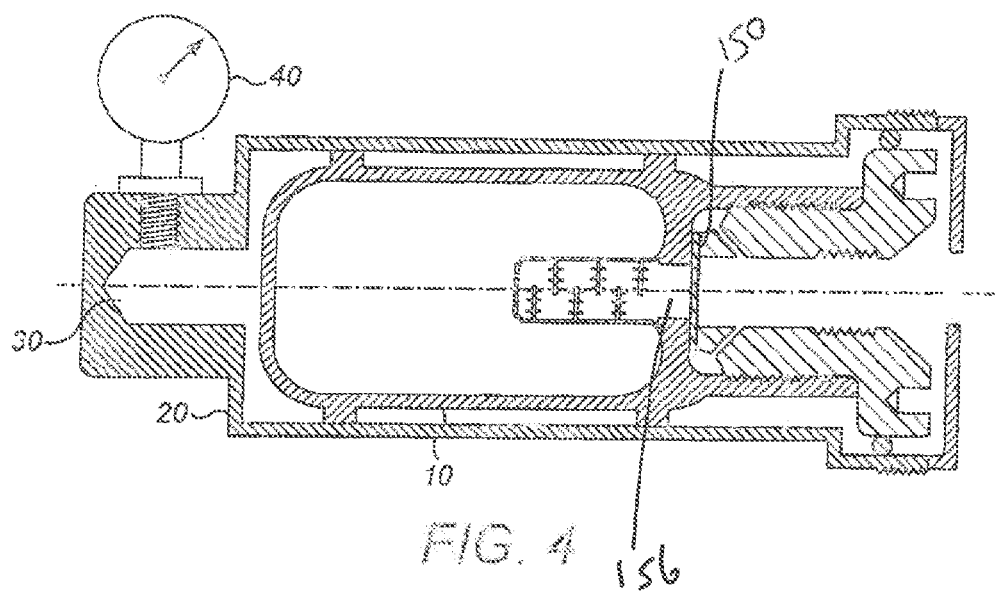
FIG. 4 depicts an example of the new type of fail-safe tank with a manometer attached.

In some examples, the pressure sensor 40 may be a manometer that is provided to extend through the wall of the second enclosure 20 and into the chamber 30 between the first 10 and second enclosures 20. The shapes of the walls of these enclosures may also advantageously be achieved by an additive manufacturing method as described above. Of course, other methods, such as machining or casting, may also be used. FIGS. 3 and 4 both depict a manometer positioned in this way. If these parts are made via a 3D method such as additive manufacturing, it is possible to integrate the functions of the components into the same part. If, however, these are formed via machining, the costs may be higher in comparison.

The invention claimed is:

1. A tank comprising:
   a first, inner enclosure provided inside a second, outer enclosure to form an enclosed chamber between the outer surface of the wall of the first enclosure and the inner surface of the wall of the second enclosure, and
   wherein a first pressurized gas is provided within said first, inner enclosure; and
   wherein a pressure measuring sensor is positioned relative to said chamber so as to allow the measurement of a pressure within said chamber;
   wherein a wall of said first, inner enclosure comprises a section that is configured to perforate upon application of an impact force to said section; and
   wherein the inner enclosure is permanently sealed with said section.

2. A tank comprising:
   a first, inner enclosure provided inside a second, outer enclosure to form an enclosed chamber between the outer surface of the wall of the first enclosure and the inner surface of the wall of the second enclosure;
   wherein a first pressurized gas is provided within said first, inner enclosure; and
   wherein a pressure measuring sensor is positioned relative to said chamber so as to allow the measurement of a pressure within said chamber; and
   further comprising:
   a pressure regulator that is integrally formed with said tank.

3. The tank of claim 2, wherein said pressure regulator includes a first end positioned internally to said inner enclosure and an opposite, second end positioned at an exit of said inner enclosure, and wherein said second end comprises a section that is configured to perforate upon application of said impact force to thereby open said exit.

4. The tank of claim 3, wherein said section that is configured to perforate comprises a membrane.

5. The tank of claim 1 wherein said tank is connectable to an actuating system to allow said first pressurized gas to flow from an exit of said first enclosure of said tank to said actuating system.

6. The tank of claim 1, wherein said first enclosure and/or said second enclosure are made by an additive manufacturing method.

7. The tank of claim 1, wherein said pressure sensor comprises a membrane and a strain gauge and wherein said membrane is made by an additive manufacturing method.

8. The tank of claim 7, wherein said tank is a pneumatic tank connectable to a pneumatic door actuating mechanism.

9. The tank of claim 7, wherein said tank is a pneumatic tank connectable to an aircraft inflatable evacuation slide.

10. A method of detecting a leak through a wall of the inner enclosure or outer enclosure of a tank as recited in claim 1, said method comprising one of:

using said pressure measuring sensor to measure the pressure in said chamber and detecting a change in said pressure over time, said change in pressure over time indicating said leak;

comparing the pressure within said chamber to a pressure outside of said chamber; and comparing the pressure within said chamber to a threshold or thresholds to detect an increase or decrease in said pressure within said chamber, said increase or decrease indicating said leak.

11. A method for manufacturing a pneumatic tank comprising:

forming a first, inner enclosure within a second, outer enclosure, to provide an enclosed chamber between the first enclosure and the second enclosure, and providing a pressure measuring sensor positioned relative to said chamber so as to allow for the measurement of a pressure within said chamber.

12. The method of claim 11, further comprising:

forming said first and second enclosures and a membrane of said pressure measuring sensor by an additive manufacturing method.

* * * * *